Feb. 16, 1965    F. S. HUMMEL    3,169,647
NUCLEAR REACTOR FUELLING MACHINE
Filed Feb. 15, 1963    9 Sheets-Sheet 1
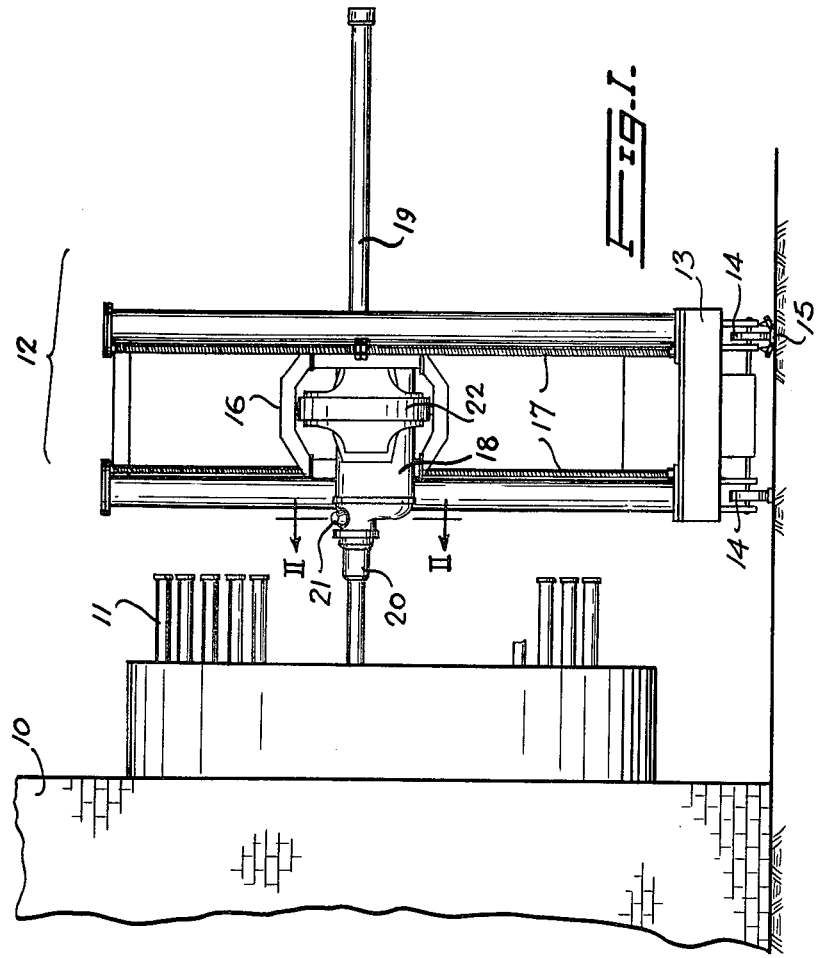
Inventor
Frederick S. Hummel
By Stevens, Davis, Miller & Mosher
Attorneys

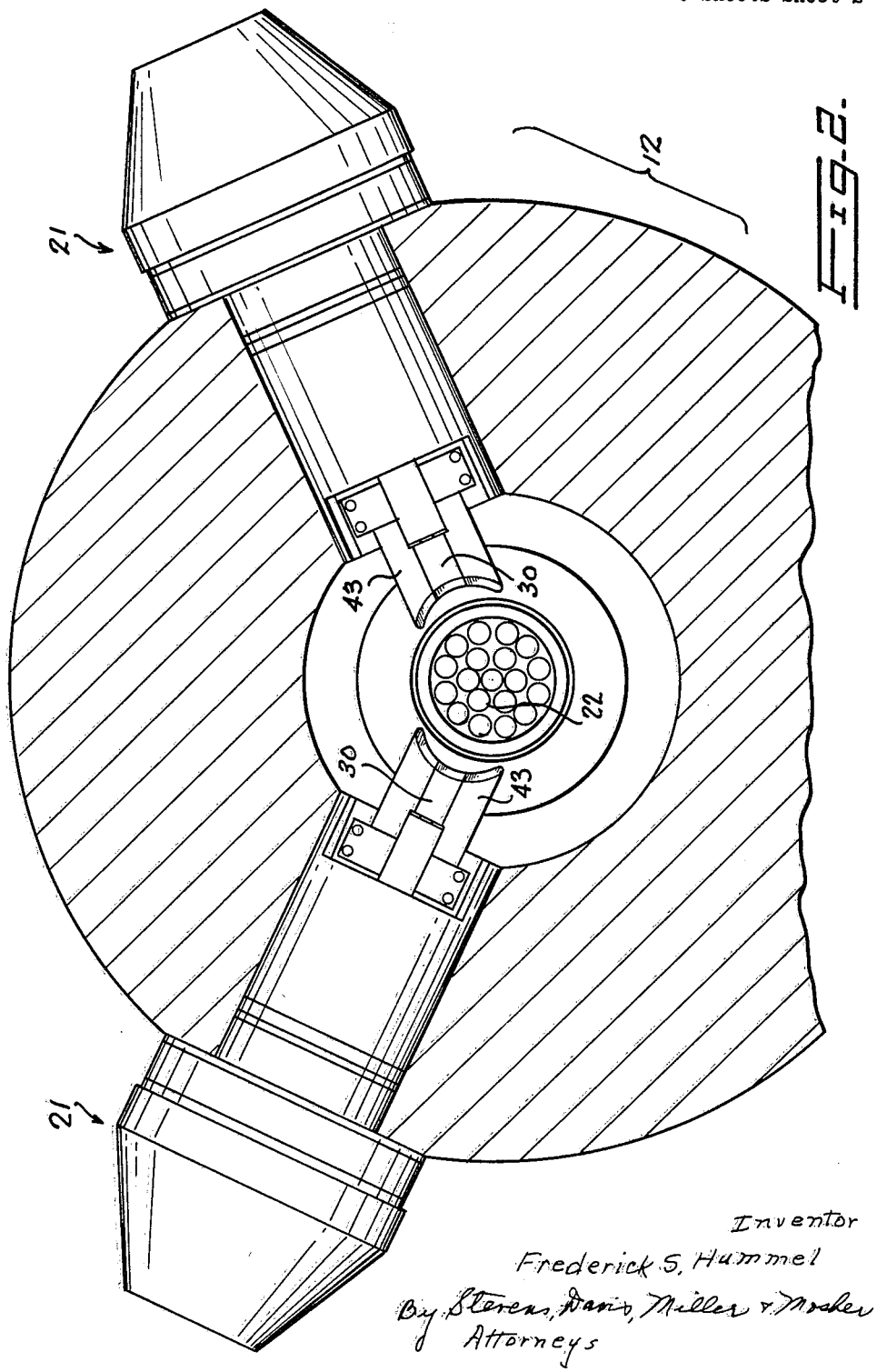

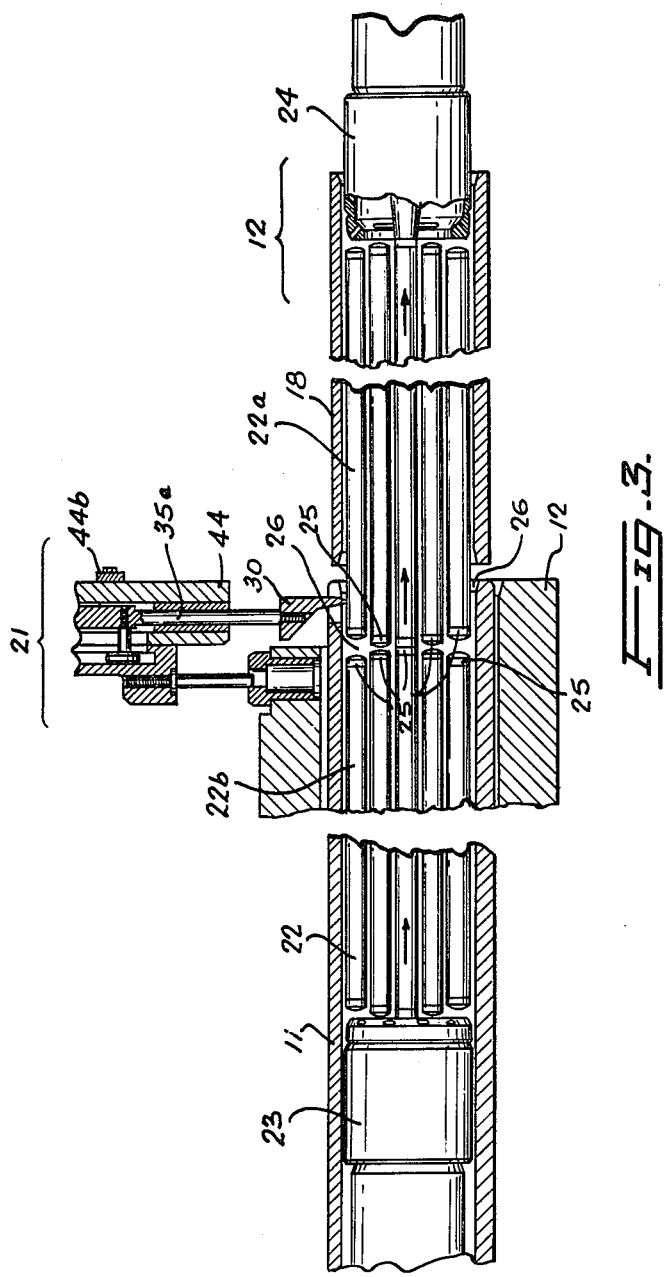

Feb. 16, 1965   F. S. HUMMEL   3,169,647
NUCLEAR REACTOR FUELLING MACHINE
Filed Feb. 15, 1963   9 Sheets-Sheet 4
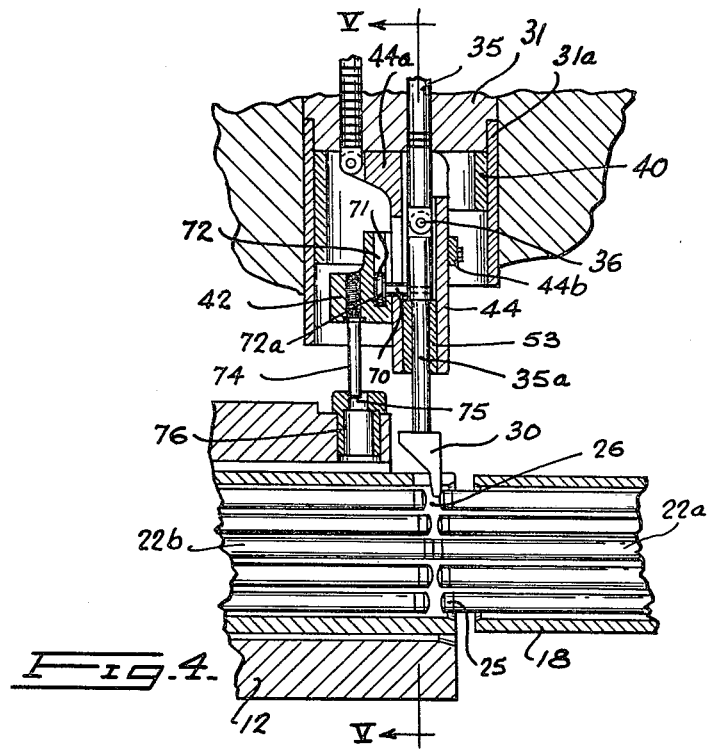
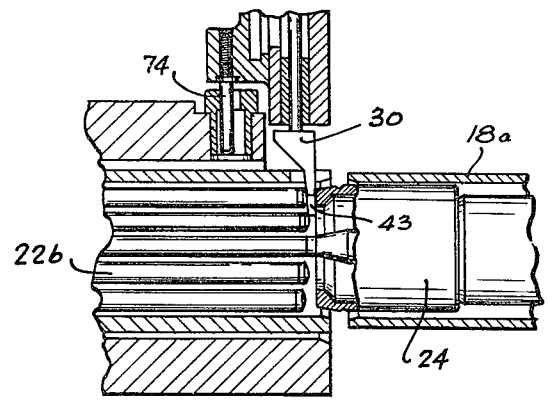
Inventor
Frederick S. Hummel
By Stevens Davis Miller & Mosher
Attorneys Feb. 16, 1965    F. S. HUMMEL    3,169,647
NUCLEAR REACTOR FUELLING MACHINE
Filed Feb. 15, 1963    9 Sheets-Sheet 5

Inventor
Frederick S. Hummel
By Stevens, Davis, Miller & Mosher
Attorneys

Inventor
Frederick S. Hummel
By Stevens Davis Miller & Mosher
Attorneys

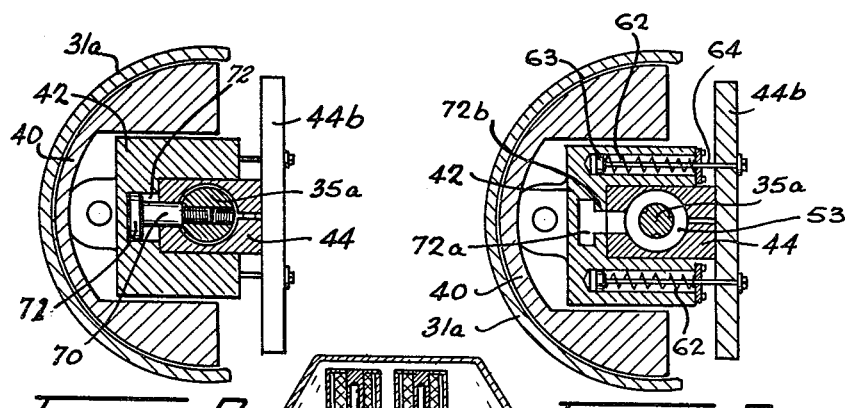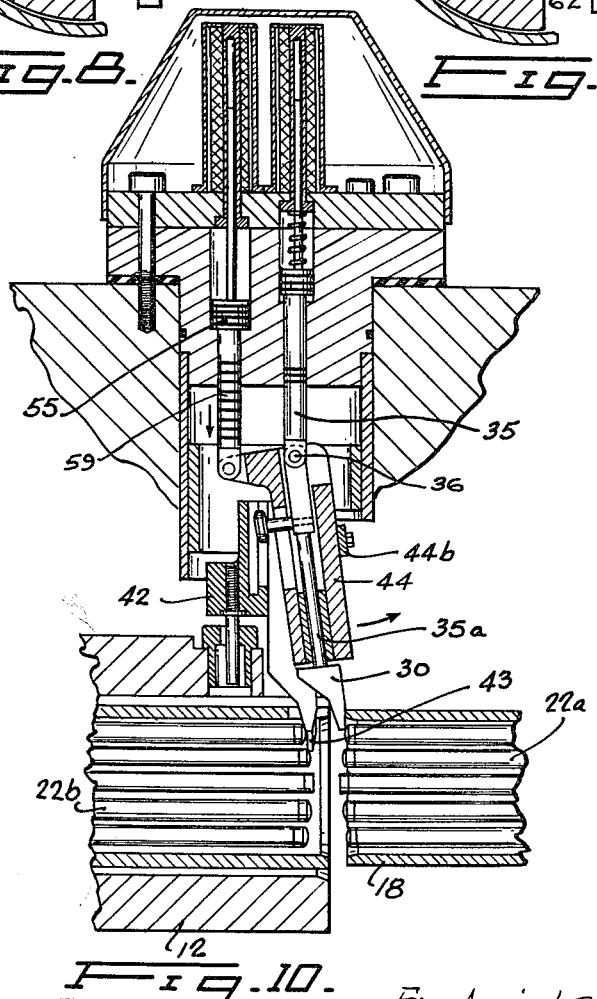

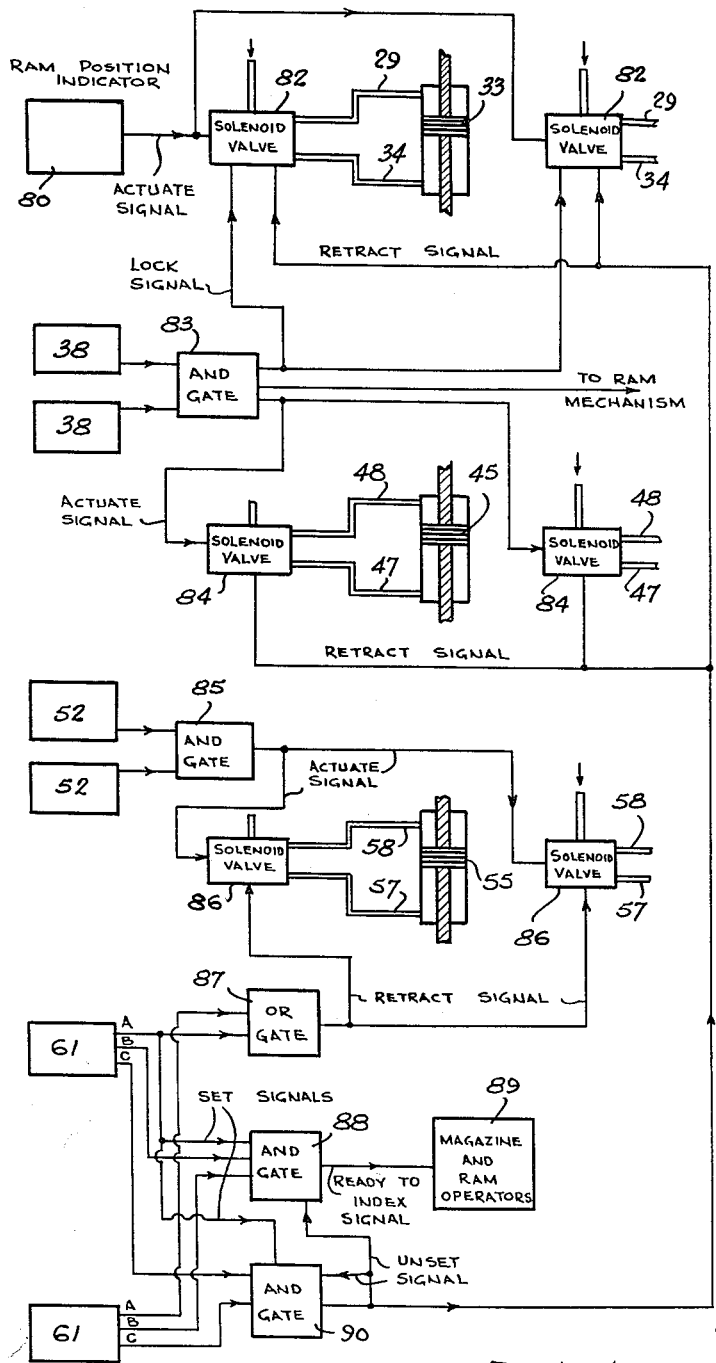

3,169,647
NUCLEAR REACTOR FUELLING MACHINE
Frederick S. Hummel, Islington, Ontario, Canada, assignor to Atomic Energy of Canada Limited, Ottawa, Ontario, Canada, a corporation
Filed Feb. 15, 1963, Ser. No. 258,742
Claims priority, application Canada, June 22, 1962, 852,177
5 Claims. (Cl. 214—23)

This invention relates to fuelling machines for nuclear reactors.

A typical nuclear reactor, in association with which the fuelling machine to be described below could conveniently be used, has a large number of horizontal tubes each containing a series of fuel bundles and each arranged to convey fluid coolant under pressure past such bundles for the extraction of heat. Such an arrangement is conventional. Since the nuclear fuel in the bundles is slowly consumed, fresh bundles are loaded into the tubes on one side of the reactor in accordance with a prearranged programme, while used bundles are withdrawn from the opposite ends of the tubes at the other side of the reactor. Essentially similar machines are employed for loading and unloading.

Whether performing a loading or unloading function, each machine is required firstly to form an extension of a chosen reactor fuel tube and then to disengage a pressure sealing plug from the end of such tube. After equalizing the pressure in the two machines with that of the coolant in the tube, the plugs in each end of the tube are removed for a loading operation to commence. Both machines includes a ram and, while the ram of the unloading machine is pushed up into engagement with the end of the last fuel bundle in the row (the bundle to be removed) to hold the row of bundles against movement out of the tube induced by coolant flow, the ram of the loading machine is withdrawn, its magazine is indexed to position a new fuel bundle in line with the ram, and then the ram is forced forward to drive this bundle into the tube. At this stage of the operation, the ram of the unloading machine is withdrawn at a controlled rate to allow the row of bundles to move through the tube so that the last bundle is pushed out into the magazine of the unloading machine for indexing out of register with the ram and subsequent disposal. The ram of the unloading machine then returns to engage the next bundle in the row, which has now become the end bundle, and, in conjunction with the ram of the loading machine, pushes the row back again into a centrally located position in the reactor tube. One fresh bundle has thus been added at the loading end and one spent bundle has been removed at the unloading end. Finally, the plugs are replaced at each end of the tube, and the fuelling machines move into alignment with another tube to carry out a similar operation.

This description of the manner of operation of a pair of loading and unloading machines has deliberately been made brief and general. In practice the sequence of steps involved in a refuelling operation is quite lengthy. However, a detailed description of all these steps would be out of place in this specification, since the inventive advance with which this specification is concerned involves improvements in the structure and operation of mechanism for accurately determining the position of the fuel bundles during the withdrawal of a spent bundle from the row of bundles into the magazine of the unloading machine.

Thus, although the loading and unloading machines are the same as one another in most respects, and indeed it may be convenient in any given installation to make the machines identical so that their functions can be interchanged once installed, there is one aspect of the unloading procedure which the unloading machine must take care of, which has no counterpart in the loading procedure and consequently requires no apparatus in the loading machine unless, as indicated above, the loading machine is constructed so as to be able to serve as an unloading machine also. For this reason, and in view of the close similarity between loading and unloading machines, they are referred to collectively in this specification as fuelling machines.

The primary object of the present invention is to provide sensing and stop mechanisms for accurately locating the position of the end of a fuel bundle in the row of fuel bundles extending from a reactor tube into a fuelling machine acting as an unloading machine. It is necessary to know the exact position of the end of a fuel bundle, in order properly to locate the spent fuel bundle in the magazine of the machine. In practice, the positions of the ram are accurately known, but the exact lengths of the bundles vary somewhat in manufacture and use, and are, of course, a function of temperature. It is thus undesirable to rely on the ram positions to predict the exact position of the line of junction between the adjacent ends of a pair of fuel bundles.

Further features of the present invention will appear from the specific description which follows, a description which is provided by way of example only. A manner in which the invention may be carried into practice is illustrated diagrammatically in the accompanying drawings.

FIGURE 1 is a small scale, elevation view of a fuelling machine shown in general outline only;

FIGURE 2 is a section on the line II—II in FIGURE 1;

FIGURE 3 is a longitudinal central section broken in two places to illustrate the cooperation between a row of fuel bundles and the rams of the loading and unloading fuelling machines;

FIGURE 4 is a view of a portion of FIGURE 3 showing the area around the bundle position sensing mechanism;

FIGURE 8 is a section on the line VIII—VIII in FIGURE 6;

FIGURE 9 is a section on the line IX—IX in FIGURE 6;

FIGURE 10 is a view similar to FIGURE 6 showing the parts in the positions occupied at yet a later stage in the operation;

FIGURE 11 is a fragment of FIGURE 10 showing the parts in yet a later position; and FIGURE 12 is a simplified diagrammatic representation of a control circuit.

Figure 5:
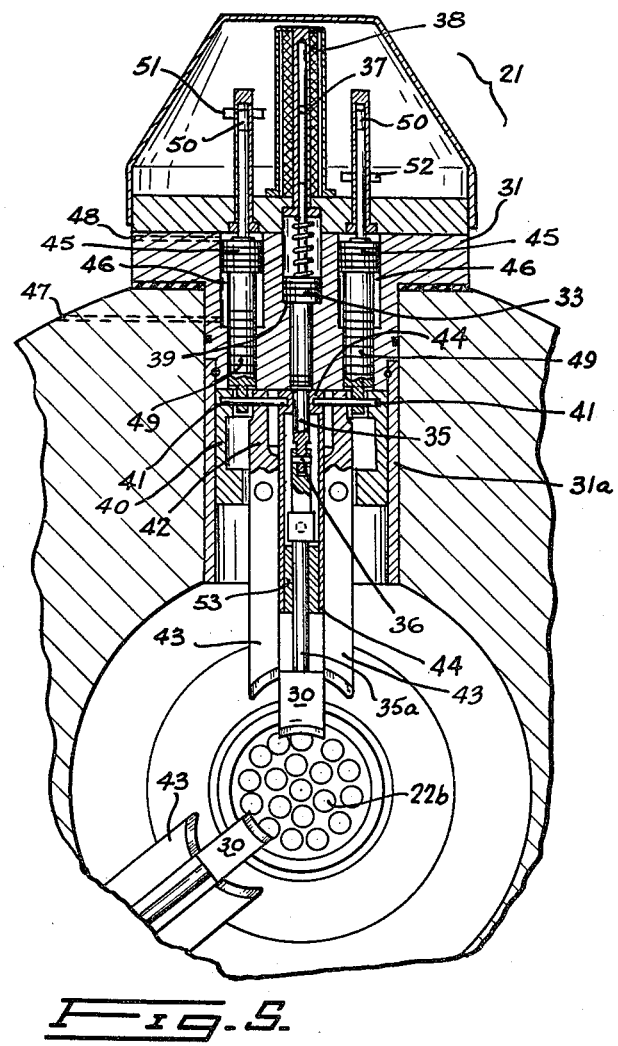
FIGURE 5 is a section on the line V—V in FIGURE 4.

FIGURE 1 shows the function of the machine in general terms. A nuclear reactor 10 has a plurality of horizontal tubes 11 each containing a row of fuel bundles. The unloading machine 12 comprises a frame 13 mounted on wheels 14 engaging rails 15 for rectilinear horizontal movement into alignment with a selected tube 11. Vertical indexing is achieved by mounting a carriage 16 on two vertical pillars 17. The magazine 18 and ram mechanism 19 are mounted on the carriage 16. Suitable motors and controls (not identified) are employed to align the snout 20 of the machine with any desired one of the tubes 11. Details of the aligning and ram mechanisms respectively are provided in F. S. Hummel United States patent application Serial No. 258,700, filed February 15, 1963 and United States patent application Serial No. 177,567, filed March 5, 1962, respectively.

The sensing and stop mechanisms 21 with which the present application is concerned are provided on the machine 12 just forwardly (that is on the reactor side) of the magazine 18. As is shown in FIGURE 2, two such mechanisms are employed. They are alike and in much of the description and illustration which follows, reference will be made to only one mechanism, it being assumed that the second mechanism is constructed and operates similarly with the first mechanism. As will appear when consideration is given to the control circuit, there are occasions when signals from both mechanisms are required before subsequent actions can occur. The mechanisms thus act as a check against the proper performance of each other.

FIGURE 3 shows a reactor tube 11 containing a row of fuel bundles 22. The left hand end of Figure 3 shows the ram 23 of the loading machine, while the right hand end of this same figure shows the ram 24 of the unloading machine, such ram bearing against the last fuel bundle 22a at the end of the row of bundles which extends into the unloading machine 12. This last or "spent" fuel bundle 22a is shown in FIGURE 3 as lying mainly within the magazine 18 of the unloading machine 12, the rams and fuel bundles between them requiring about two inches further travel to the right before the spent bundle 22a lies wholly within the magazine 18. It is one of the purposes of this operation to bring the spent bundle 22a to lie accurately within the magazine 18, so that such magazine can be indexed around to remove the bundle from alignment with the row of bundles to enable the ram 24 to return and subsequently engage the next fuel bundle 22b.

As will be observed, each of the fuel bundles consists of a group of rods secured in parallel relation to one another in concentric circular arrangement (see FIGURE 2). These rods are maintained in their proper spaced relationship by spiders (not shown), thus allowing coolant fluid to flow around each individual rod. The rods are fitted with end caps 25 (FIGURE 3) and the lengths of the rods are graded from longer to shorter from the center outwards, so that, when adjacent ends of a pair of bundles abut each other, the only surfaces in contact are the end caps 25 of the respective central rods. A substantial gap 26 is left between the opposed ends of those rods of adjacent fuel bundles that are arranged in the outermost layer of rods. This gap 26 is used for cooperation with the two sensing and stop mechanisms 21, which latter will now be described in further detail.

Figure 6:
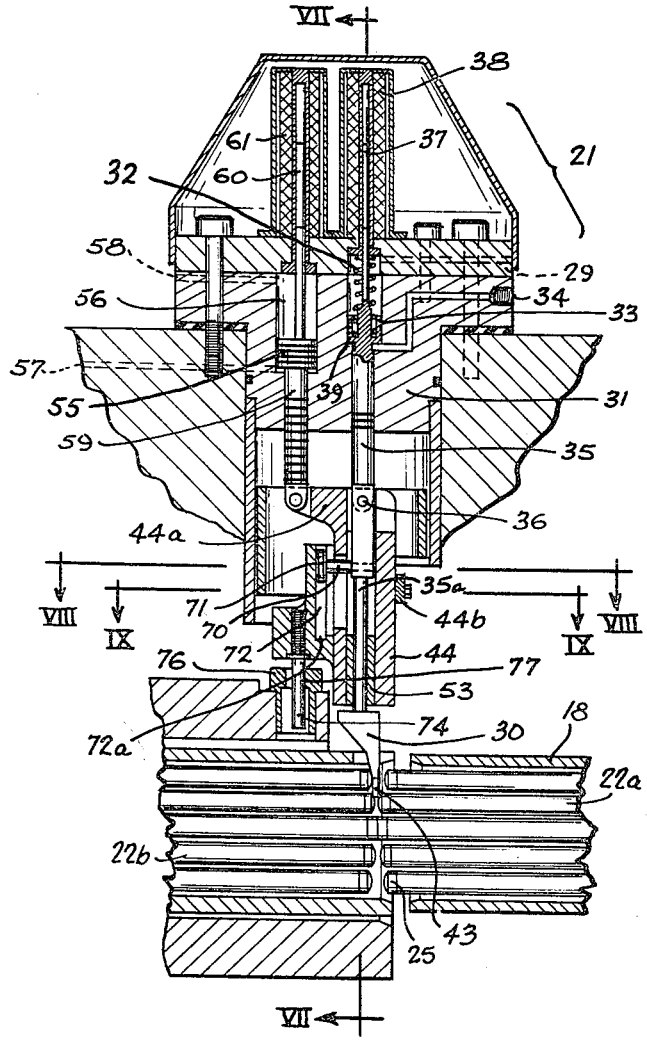
FIGURE 6 is a view of the same parts as FIGURE 4 at a later stage in the operation.

Each of the mechanisms 21 includes a slidably mounted sensor 30 which is urged to projecting position by a spring 32 (FIGURE 6), but can be held in withdrawn position in spite of such spring, by fluid pressure exerted against a face of a piston 33 and supplied through inlet 34. Piston 33 is connected to the sensor 30 by means of rods 35, 35a, articulated by pin 36 to permit the rod 35a connected to sensor 30 a degree of pivotal freedom about a horizontal axis for reasons that will become clear below. Rod 35 which slides snugly in casing 31 has a ferromagnetic extension 37 which cooperates with a coil 38 to signal the control circuit the position of the sensor 30. Piston 33 can be locked down by fluid pressure applied at line 29.

The overall operation of the mechanism in conjunction with the control circuit will be more fully described below. For the purposes of the present stage of the description, it is sufficient to state that, when the rams 23, 24 reach a position in which the gap 26 between fuel bundles 22a and 22b reaches an appropriate short distance from alignment with the sensors 30 of the mechanisms 21 (say two inches), fluid pressure that has previously been acting against piston 33 in each mechanism to hold sensors 30 withdrawn from the fuel bundles (FIGURE 2 position) is released to allow each spring 32 to push its associated sensor 30 out into gentle but firm contact with the outermost rods of the fuel bundle 22a. This is the condition shown in FIGURE 3. The piston 33 has not completed its maximum outward throw, but any further movement of its assembly is prevented by the bearing of sensor 30 on the fuel rods. The rams continue in slow speed to move the row of fuel bundles, until finally the position shown in FIGURES 4 and 5 is reached, that is the sensor 30 drops into the gap 26. The extent of this movement is limited by the piston 33 engaging the surface 39, so that sensor 30 does not pass inwardly of the bundle beyond the outer layer of rods. Nevertheless this small additional movement of the sensor 30 is signalled to the control circuit by means of coil 38.

The fuel bundles have now reached the desired position, a fact which the sensor 30 has detected and signalled to the control circuit. It is now time for the stop portion of each of the sensing and stop mechanisms 21 to come into play and this aspect of each of the mechanisms 21 will now be described.

Within a fixed tube 31a forming part of the casing 31 of the mechanism 21, there is slidingly mounted a sleeve 40 that is connected by means of pivot pins 41 to a member 42 that extends parallel to and around the rods 35, 35a to terminate in a forked stop 43 that straddles the sensor 30.

Intermediate the member 42 and the rod 35a (as best seen from FIGURE 8) there is positioned a deflector 44 that tightly embraces the rod 35a by means of a bearing 53 (while allowing the latter freedom of longitudinal movement), the deflector 44 being pivotally mounted at one end on pivot pins 41 so as to move towards and away from the fuel bundles together with the member 42, while being free to pivot relative to the member 42 about the pivot pins 41.

Movement of the stop-carrying member 42 and hence of the deflector 44 towards and away from the fuel bundles is controlled by pistons 45 travelling in cylinders 46 and acted on by fluid pressure admitted through lines 47 and 48, pistons 45 being connected by rods 49 to pivot pins 41 and carrying ferro-magnetic extensions 50 cooperating with magnetic switches 51 and 52.

Pivoting of deflector 44 about pivot pins 41 is controlled by a piston 55 (FIGURE 6) movable in cylinder 56 under the influence of fluid pressure admitted through lines 57 and 58, and having a rod 59 connected to a lateral extension 44a of deflector 44. A ferro-magnetic extension 60 of the rod 59 cooperates with a coil 61 to signal the position of piston 55.

Figure 7:
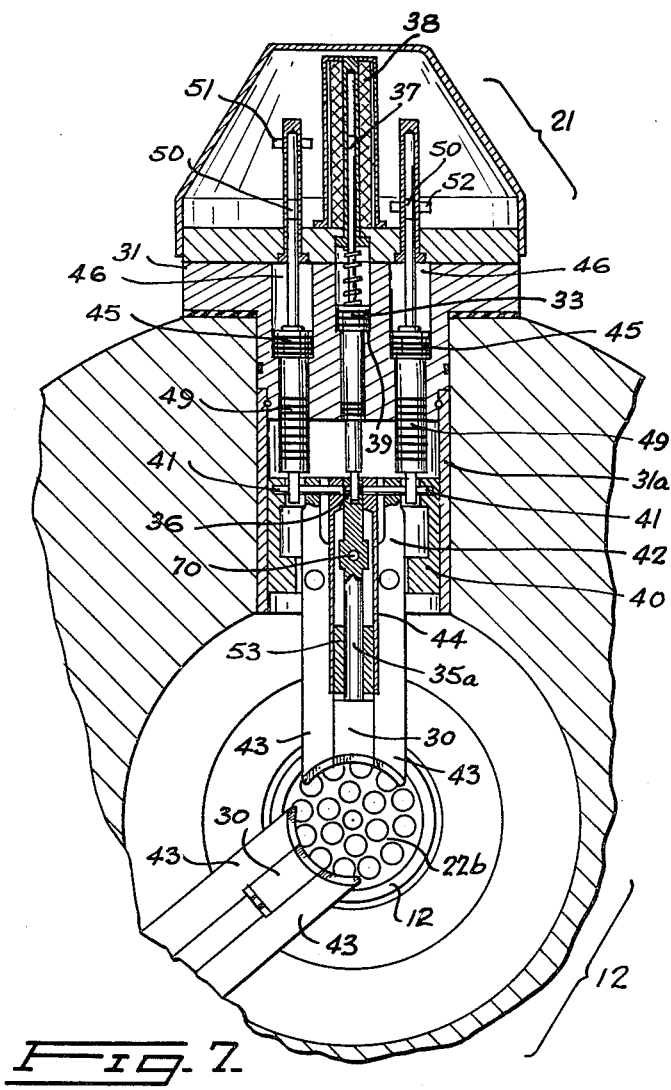
FIGURE 7 is a section on the line VII—VII in FIGURE 6.

Thus the sensor 30 and its associated parts are capable of longitudinal movement independently of the remaining movable parts, namely the stop-carrying member 42 and the deflector 44 which necessarily move together longitudinally, while the deflector 44 can pivot relative to member 42 about the pins 41 under the control of piston 55, such movement being resisted at all times by coil springs 62 (FIGURE 9) that are positioned in cavities in the member 42 and act on the heads 63 of rods 64 that are connected to a plate 44b secured to the deflector 44. In addition, pivotal movement of deflector 44 is also further restrained, in one position of the parts, namely the position of FIGURE 4. The sensor rod 35a carries a transversely projecting pin 70 having an enlarged head 71 that slides in a slot 72 formed in stop-carrying member 42. At its upper end slot 72 is as broad as the head 71, as demonstrated by FIGURE 8, and offers no impediment to movement of the deflector 44 to the right in this view. However, the lower end 72a of slot 72 is formed with a neck 72b (see FIGURE 9) through which the head 71 cannot pass. Accordingly, when the sensor 30 is in projecting position, while the forked stop 43 is withdrawn (the position of FIGURE 3, or the position of FIGURES 4 and 5), the pin head 71 is restrained from movement out of slot end 72a and the deflector 44 and stop-carrying member 42 are effectively locked together. Later in the operation when the stop-carrying member 42 is moved to projecting position (FIGURES 6 and 7), the pin head 71 lies in the unrestricted area of slot 72 leaving deflector 44 free to move relatively to stop-carrying member 42. When this movement occurs it takes the form of pivoting of deflector 44 about pivot pins 41, deflector 44 carrying the rod 35a and sensor 30 with it in such movement, for which purpose the pivot pins 41 and pin 36 articulating the rods 34, 35a are arranged to be coaxial when the parts are in the position shown in FIGURES 6 and 7.

The stop-carrying member 42 carries a projecting stop pin 74 extending in the direction of travel of member 42 and adapted, when the member 42 is in its projecting position, to enter a hole 75 in a cooperating stop 76 fixed to the machine 12, thus ensuring accurate positioning of the forked stop 43 in relation to the machine as a whole.

After the sensor 30 has been urged into the gap 26 by the spring 32, as demonstrated by FIGURES 4 and 5, the control circuit causes fluid to move pistons 45 outwardly to insert the forked stop 43 into gap 26. Slow movement of the rams 23, 24 continues for a short time until the outer rods of the fuel bundle 22b have come to bear against sensor 30 and forked stop 43, thus preventing any further fuel travel. The ram 23 of the loading machine continues to maintain some forward force on the row of fuel bundles thus ensuring that they remain firmly pressed together end-to-end. Any looseness in the construction tending to allow the stop 43 to yield to this pressure is prevented from being effected by stop pin 74 engaging surface 77 of stop 76. This is the position shown in FIGURES 6 and 7.

It is still necessary, however, to cause the spent fuel bundle 22a to travel further into the magazine 18 before the latter can be indexed. For this purpose fluid pressure is applied to piston 55 to rock the deflector 44 in the manner shown in FIGURE 10. Sensor 30 thus pushes the bundle 22a into the magazine 18, while bundle 22b is held back by the stop 43. The ram 24 of the unloading machine yields to this movement, and, after it is complete, the ram 24 is fully withdrawn to leave the magazine 18 free to index around and align an empty tubular portion 18a (FIGURE 11) of the magazine with the ram 24 which then is again extended to engage the bundle 22b and apply sufficient force thereto to balance the force being applied by the ram 23 at the other end of the row. During this latter movement the sensor 30 will have been moved back into alignment with the stop 43 a fact detected by coil 61. The control circuit then acts to withdraw both the sensor 30 and stop 43 of both mechanisms 21 which thus again take up the positions of FIGURE 2. The rams then cooperate to return the row of fuel bundles 22 to a central position in the tube 11 and to replug this tube in readiness for the machines to move on to another reactor tube.

The sequence of operations will now be reviewed in conjunction with the control diagram of FIGURE 12. A ram position indicator 80 associated with the unloading machine provides coarse detection of the ram position and is set to produce an ACTUATE signal, on the ram 24 reaching a position corresponding approximately to that shown in FIGURE 3, that is about two inches short of the final position. Two solenoid valves 82 are shown, one for each of the mechanisms 21. Each valve 82 controls the supply of fluid to a respective piston 33 through lines 29 and 34. On being actuated by ram position indicator 80, each of the valves 82 releases pressure from its associated line 34 to allow the spring 32 to move down the respective piston 33 to lower its sensor 30 (FIGURE 3 condition).

When the sensors 30 fall into the gaps 26 (FIGURE 4), the coils 38 detect these movements so that AND gate 83 is operated to send a LOCK signal to valves 82 to pressurise lines 29 to hold the sensors 30 in fully extended position, and to send an ACTUATE signal to solenoid valves 84 that control the pairs of pistons 45 of respective mechanisms 21. This action lowers stops 43 and the parts assume the positions of FIGURES 6 and 7, a fact which is detected by the switch 52 of each mechanism. A further signal from gate 83 may be derived and fed to the ram mechanism to stop the same, or, if preferred, the movement of the ram mechanism need not be arrested.

Switches 52 energise an AND gate 85, so that proper lowering of the stop 43 of each mechanism 21 is required to cause an ACTUATE signal to pass to solenoid valves 86 that control the supply of fluid to pistons 55 for moving the deflector 44 of each mechanism.

Each deflector 44 is capable of three positions: an A position, in which the sensor 30 has been moved a maximum distance towards the magazine 18 (FIGURE 10); a B position, which is the normal central position (FIGURE 6); and a C position, in which the sensor has been pushed forward (away from the magazine 18) by the ram 24 (FIGURE 11). As soon as either of coils 61 detects its associated deflector 44 in an A position it energizes OR gate 87 to send a RETRACT signal to valves 86. At the same time one of the coils 61 sends a SET signal to AND gates 88 and 90. Deflectors 44 are withdrawn by pistons 55 to position B leaving the spent fuel bundle 22a lying wholly in magazine 18. When both such deflectors 44 have reassumed position B, AND gate 88 is energised to signal the magazine and ram operators 89 (which may be automatic, or may be human) that the parts are in position ready for the magazine to be indexed.

After the indexing operation has been completed, ram 24 comes forward again, as in FIGURE 11, to contact the end of the next fuel bundle 22b. As ram 24 pushes the fuel bundles forward, it also moves the deflectors 44 to C position. Coils 61 then energize AND gate 90 to send RETRACT signals to the other solenoid valves 82, 84 to return the parts to their original position and to send UNSET signals to gates 88 and 90.

I claim:

1. In a fuelling machine for a nuclear reactor, including means defining a passageway terminating in a snout for clamping on to an end of a reactor tube to position said passageway as a coaxial continuation of said tube; a sensing and stop mechanism mounted on the machine to project into said passageway to cooperate with a row of fuel bundles therein moved out of said tube into the machine by ram means, said mechanism comprising
   (a) a sensor,
   (b) means for urging said sensor to projecting position to bear resiliently against a side of a fuel bundle,
   (c) means for sensing movement of said sensor into a gap between the outer peripheries of abutting ends of adjacent fuel bundles,
   (d) a stop,
   (e) means actuated by said sensing means for moving said stop into projecting position aligned with said sensor to enter said gap and thereby arrest movement of the row of fuel bundles extending from said stop into the reactor tube,
   (f) and means sensitive to movement of said stop into projecting position for engaging the fuel bundle situated on the side of said stop remote from the reactor tube and for deflecting said fuel bundle along the passageway away from the reactor tube for subsequent disposal.

2. In a fuelling machine for a nuclear reactor, including means defining a passageway terminating in a snout for clamping on to an end of a reactor tube to position said passageway as a coaxial continuation of said tube; a sensing and stop mechanism mounted on the machine to project into said passageway to cooperate with a row of fuel bundles therein moved out of said tube into the machine by ram means, said mechanism comprising
   (a) a sensor,
   (b) means for urging said sensor to projecting position to bear resiliently against a side of a fuel bundle,
   (c) means for sensing movement of said sensor into a gap between the outer peripheries of abutting ends of adjacent fuel bundles,
   (d) a stop,
   (e) means actuated by said sensing means for moving said stop into projecting position aligned with said sensor to enter said gap and thereby arrest movement of the row of fuel bundles extending from said stop into the reactor tube, (f) and means sensitive to movement of said stop into projecting position for moving said sensor for deflecting the fuel bundle situated on the side of said stop remote from the reactor tube along the passageway away from the reactor tube for subsequent disposal.

3. In a fuelling machine for a nuclear reactor including
(i) means defining a passageway terminating in a snout for clamping on to an end of a reactor tube to position said passageway as a coaxial continuation of said tube,
(ii) a magazine including a portion coaxial with said passageway,
(iii) and a ram mechanism mounted to extend through said magazine portion and along said passageway into said tube;
(iv) a sensing and stop mechanism mounted on the machine to project into said passageway to cooperate with a row of fuel bundles therein moved out of said tube into the machine against yielding resistance of said ram mechanism, said mechanism comprising
   (a) a sensor,
   (b) means for urging said sensor to projecting position to bear resiliently against a side of a fuel bundle,
   (c) means for sensing movement of said sensor into a gap between the outer peripheries of abutting ends of adjacent fuel bundles,
   (d) a stop,
   (e) means actuated by said sensing means for moving said stop into projecting position aligned with said sensor to enter said gap and thereby arrest movement of the row of fuel bundles extending from said stop into the reactor tube,
   (f) and means sensitive to movement of said stop into projecting position for engaging the fuel bundle situated on the side of said stop remote from the reactor tube and for deflecting said fuel bundle along the passageway away from the reactor tube and into said magazine portion for subsequent disposal.

4. A fuelling machine according to claim 3, wherein the last-mentioned means comprises said sensor and means for moving said sensor to deflect said last-mentioned fuel bundle into said magazine.

5. A fuelling machine according to claim 3, including means sensitive to movement of said stop towards the reactor tube by said ram mechanism to move said stop and said sensor to withdrawn position.

References Cited by the Examiner
UNITED STATES PATENTS
2,725,993   12/55   Smith _____ 214—23

HUGO O. SCHULZ, *Primary Examiner.*